United States Patent
Falk

(10) Patent No.: US 8,238,128 B2
(45) Date of Patent: Aug. 7, 2012

(54) POWER CONVERTER CIRCUITRY

(75) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 554 days.

(21) Appl. No.: 12/504,301

(22) Filed: Jul. 16, 2009

(65) Prior Publication Data

US 2010/0020576 A1    Jan. 28, 2010

(30) Foreign Application Priority Data

Jul. 22, 2008   (EP) ..................... 08013141

(51) Int. Cl.
*H02M 7/00*   (2006.01)
(52) U.S. Cl. ...................................... 363/124
(58) Field of Classification Search .............. 363/123, 363/124, 131
See application file for complete search history.

(56) References Cited

U.S. PATENT DOCUMENTS

| 5,237,494 A * | 8/1993 | Baader et al. ............... 363/141 |
| 2009/0103340 A1* | 4/2009 | Bremicker et al. ........... 363/123 |
| 2009/0201706 A1* | 8/2009 | Zacharias et al. ............ 363/123 |

* cited by examiner

*Primary Examiner* — Jue Zhang
(74) *Attorney, Agent, or Firm* — Panitch Schwarze Belisario & Nadel LLP

(57) ABSTRACT

A power converter circuitry for converting a DC voltage generated by a generator with varying output power in the mean voltage range into an alternating voltage for feeding into a grid, with several series-connected power converters, which are connected in parallel with said generator, as well as with a controllable bridging switch for each power converter, said bridging switch lying in a direct voltage intermediate circuit and bridging the respective power converter in the closed condition, is intended to be used for a photovoltaic generator. This is achieved in that a resistance chopper is connected between each power converter and the generator, no input diode being provided in the current path from the generator to the power converter, and that each bridging switch is connected in parallel with the resistance chopper in the direct voltage intermediate circuit.

13 Claims, 2 Drawing Sheets

POWER CONVERTER CIRCUITRY

BACKGROUND OF THE INVENTION

A power converter circuitry for converting a direct voltage of 1500 V into an alternating voltage is known from railway technology and from US 2005/284673 A1. For this purpose, several series-connected power converters are utilized, each power converter having a controllable bridging switch. Each bridging switch lies in a direct voltage intermediate circuit which bridges the respective one of the power converters when closed.

In wind power plants as they are described in EP 1 921 738 A2, a resistance chopper is connected in parallel with a full-bridge circuit of an inverter and with a capacitor in the direct voltage intermediate circuit. The direct voltage can be adapted by adding the chopper to the circuit.

The publication Calais M. et al, "Multilevel converters for single-phase grid connected photovoltaic systems: an overview", Solar Energy, Pergamon Press. Oxford, GB, Bd. 66, Nr. 5, 1. August 1999, pages 325-335, xp 004362671, issn 0038-092x describes a photovoltaic plant with several strings. An inverter or a bridge circuit and a capacitor are associated with each string.

In order to allow for high efficiency and galvanic separation in a photovoltaic plant, the document EP 1 870 996 A1 teaches combining a resistance chopper connected to a direct voltage intermediate circuit with switching elements for switching transformer taps.

It is the object of the invention to improve a power converter circuitry of the type mentioned in such a manner that it is suited for photovoltaic generators and is highly efficient.

BRIEF SUMMARY OF THE INVENTION

The invention relies on the idea of utilizing a resistance chopper instead of a boost converter. During chopper operation, part of the power in the chopper is converted into heat energy so that losses occur in chopper operation. This state is quite short however, so that it can be tolerated. On the other hand, the choppers allow to save boost converters and, as a result thereof, a diode in the current path.

Another advantage is that the plant may contain a sinusoidal filter and a mean voltage transformer that is not loaded with high di/dt values when switching the power converter.

The arrangement described has another advantage which is that, in the event of a failure in an inverter or power converter, the defective inverter can be bridged quickly using a bridging switch and that a series-connected diode in the current path can be eliminated. On boost converters, this diode prevents reverse current fed by the transformer coil from flowing into the bridging switch. Prior to switching the by-pass, the AC contactor must be opened in order to prevent the reverse current.

This circuitry is very suited for solar and photovoltaic plants. In idle operation, e.g., in the morning after sunrise, the solar generator has a high output voltage. The idle voltage usually is more than 20% higher than in the working point during feeding, i.e., it is 20% higher than a maximum power point (MPP) voltage. Thanks to the invention, the higher generator voltage in idle operation does not cause damage to the electronics during starting. The circuitry makes it possible that the solar voltage can be higher than the permissible overall voltage of the power converter circuitry.

On large solar plants, the series connection allows reducing the wiring expense on the DC side and the costs as a result thereof.

The invention relies on the observation that the redundancy in the event of a failure can be improved with the bridging switches.

In the event of a power converter failure, the corresponding power converter is moreover bridged with fewer losses.

Other advantageous implementations of the invention are recited in the dependent claims.

In principle, the circuitry of the invention is advantageous for any DC voltage source having higher idle voltage or higher voltage during starting. However, the ideal implementation is an implementation for a photovoltaic generator or for a number of photovoltaic generators in which one or more bridging switches may be turned on and off depending on the photovoltaic voltage so that the number of active power converters can be varied. Since less switches of the series-connected power converter circuitry are active in the event of low voltage, for example in case of low solar radiation, the losses are reduced.

If the plant is operated below MPP voltage (case of redundancy, one converter is bridged), the current increases by up to 15%. In this case, a current reserve (power reserve) must be provided for.

In an advantageous developed implementation of the power converter of the invention there is provided that each bridging switch is a controllable, electromechanical switch such as a contactor. As a result, the efficiency can be even further improved. A switch contact has fewer losses than a semiconductor switch. This measure is only possible if there is no boost converter with a pulsed semiconductor switch. Since there is no pulsing, a slow mechanical switch can be used.

In another advantageous implementation of the invention, the bridging switch is controllable in such a manner that, in the event of a power converter failure, said power converter is bridged by the switch. Accordingly, the bridging switches provide two functions. A first function is a run-up control and a second function is that there is provided a redundancy in the event of a power converter failure. A third function can be an adaptation to varying sun irradiation.

Through a three-phase mean voltage transformer having several primary coils, in particular low voltage coils, a galvanic separation on the one side and a deactivation of discrete power converters on the other side are possible.

It is possible to connect LC filters so that the transformer will not be loaded with high di/dt values when switching the power converter. The filters allow for a sinus signal with almost no harmonics.

Discrete power converters can be decoupled in the event of a failure if a controllable electromechanical switch, e.g., an AC contactor, is provided between each output of the power converter and the grid, in particular between a grid filter. If the contactor is open, the switches are closed once the synchronicity has been established without equalizing currents flowing. In principle, these switches may also perform other tasks such as a disconnection in the event of over current, of a short-circuit or of another failure. Alternatively, this disconnection can also be performed by a DC switch placed between generator and power converter.

An exemplary embodiment will be discussed in closer detail with reference to the drawings and other advantageous developed implementations of the invention and advantages thereof will be described.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
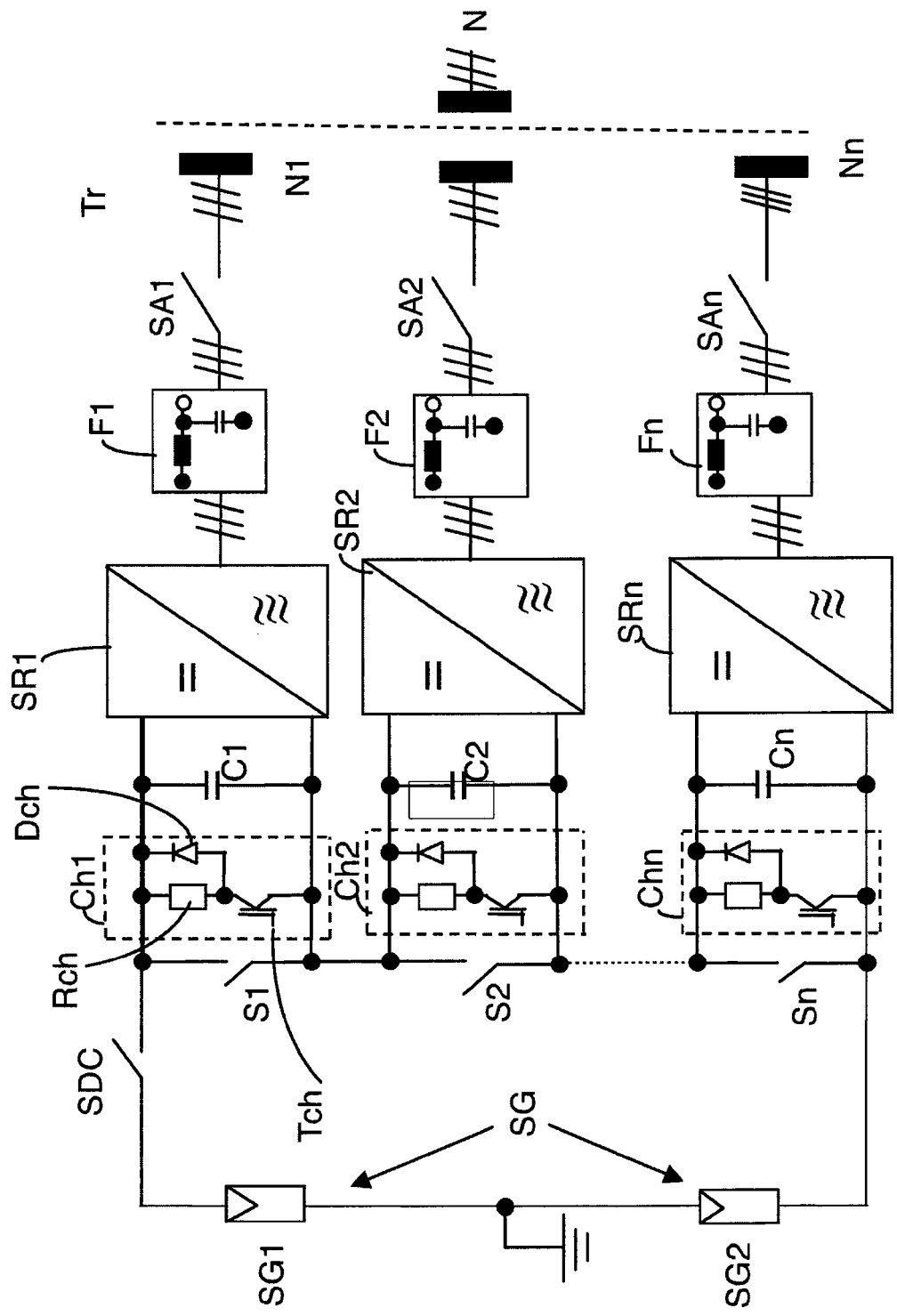
FIG. 1 is a power converter circuitry.

FIG. 1 shows a preferred embodiment of a power converter circuitry of the invention for a solar plant for feeding into a grid N. It incorporates several power converters SR1 through SRn which are series-connected downstream of a solar or photovoltaic generator SG. By series-connecting several power converters SR1 through SRn the wiring expense is reduced on the DC side.

The generator SG consists of two series-connected photovoltaic groups SG1, SG2, which are grounded at their connection point so that a positive, a negative and a zero volt voltage, meaning a bipolar voltage or center point grounding is provided. Each photovoltaic group SG1, SG2 may consist of several parallel and/or series-connected solar cells or modules in order to deliver the required voltage or power. Alternatively, there may be provided one single module group with grounding at the positive pole, the negative pole or without grounding.

Several DC contactors S1 through Sn are also connected in series parallel to the power converter SR1-SRn with which they are associated. One chopper Ch1 through Chn is mounted in parallel with each contactor S1 through Sn. An intermediate circuit capacitor C1 through Cn is connected in parallel with each chopper Ch1 through Chn. The power converter SR1 through SRn comes behind each capacitor C1 through Cn. The power converters SR1 through SRn have a three-phase output voltage. The power converters SR1 through SRn connected to low-voltage coils of a three-phase mean voltage transformer Tr.

A filter, in particular an LC filter F1 through F3 (Fn), as well as an AC contactor SA1 through SAn is connected between each power converter SR1 through SRn. Another DC contactor SCD is connected between the photovoltaic generator SG and the series connection consisting of the contactors S1 through Sn, said contactor being capable of disconnecting the generator from the power converter circuit.

Each chopper is configured to be a resistance chopper Ch1-Chn and preferably consists of three component parts, namely of a resistance $R_{ch}$, of a semiconductor switch $T_{ch}$ and of a diode $D_{ch}$. The semiconductor switch $T_{ch}$ is pulsed when the chopper is in operation so that a variable resistance current is possible. The resistance and the semiconductor switch are connected in series. The diode $D_{ch}$ is connected in parallel with the resistance, namely anti-parallel. This means that it is oriented in the opposite direction to the semiconductor switch $T_{ch}$. The diode $D_{ch}$ performs the function of a freewheeling diode.

Each power converter incorporates a three-phase bridge circuit made from semiconductor switches, which switch the direct current to an alternating current. The resistance choppers Ch1-Chn also have the function of optimal exploitation of a semiconductor in the power converter or of preventing them from damage. Each chopper Ch1-Chn loads the generator SG or the solar panel before the plant feeds energy into the grid N through the three-phase power converter or converters SR1-SRn.

The power converters Ch1-Chn only start operating when the photovoltaic voltage has adopted a value below the idle voltage of the generator SG due to the load of the chopper.

If several inverters are connected in series, these resistance choppers Ch1-Chn can be used simultaneously in order to bring the plant back to a secure state in the event of a failure of one of the several three-phase power converters SR1-SRn.

A defective three-phase power converter SR1-SRn can be short-circuited using one of the contactors S1-Sn so that the plant can continue to be operative with n-1 power converters. As a result, the redundancy of the plant increases.

Each chopper Ch1-Chn and each power converter is devised for in particular about 1.2 times the nominal current so that the solar plant can be operated with a voltage below MPP in the event of a failure of a power converter SR1-SRn.

On the output side, the power converter SR1-SR2 is connected with a transformer Tr. This power converter has a number of primary windings N1-Nn, which corresponds to the number of power converters, each power converter SR1-SRn being connected to a respective one of the primary windings N1-Nn. The voltage at the secondary winding N2 of the transformer Tr is higher than the input voltage, which is higher than 1 kV in the mean voltage range. The output voltage may be e.g., 10 kV-35 kV/50 Hz. The input voltage of the transformer may generally be e.g., 300 through 400 V at the most.

Figure 2:
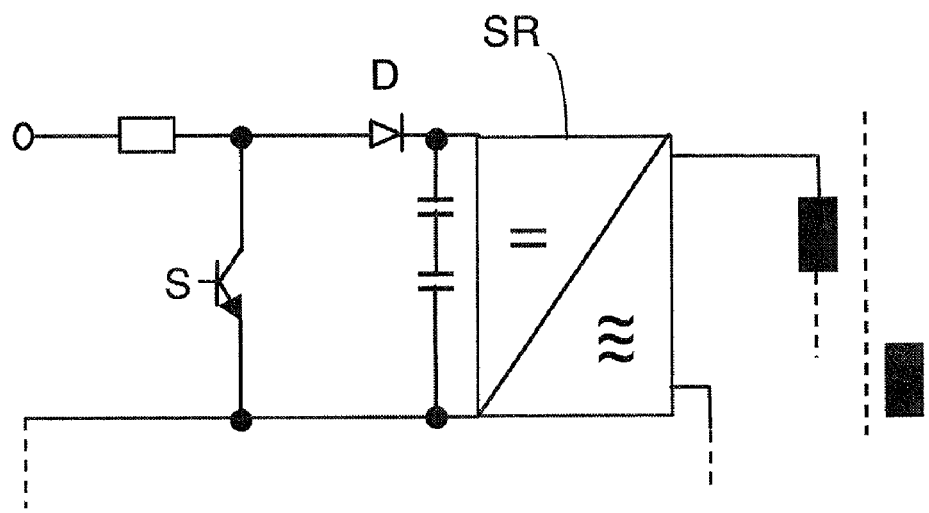
FIG. 2 is a part of a prior art power converter circuitry.

FIG. 2 shows, for comparison, a circuit according to the state of the art described herein above for a wind power plant. In each power converter circuit SR there is provided a diode D, which lies in the current path and which causes losses. This lossy input or series diode D is not provided in accordance with the invention.

A control of the run-up of the circuit preferably occurs as follows:

At first, the DC contactors S1-Sn and the AC contactors are caused to open. Each chopper Ch1-Chn is pulsed until the voltages at the intermediate circuit capacitors C1-Cn are low enough. Each power converter is put into operation and a working point is set. Next, the power converters are synchronized at mains frequency 50/60 Hz. Then, all the AC contactors SA1-SAn are switched on. Each chopper Ch1-Chn is then deactivated and no longer pulsed.

Controlling of a power converter failure occurs as follows:

At first one checks whether a power converter SR1-SRn has failed e.g., with a connected measurement device. Then, the entire plant is switched off by no longer triggering the power converters SR1-SRn and the contactor SDC is caused to open. The choppers Ch1 through Chn are pulsed in order to discharge the capacitors C1 through Cn. If the power converter SRk has failed, the associated contactor Sk is caused to close. The contact SDC is caused to close. The capacitors C1 through Cn (except Ck) charge. The choppers Ch1 through Chn except Chk are triggered and keep the capacitor voltage below a maximum value. The power converters SR1 through SRn (not SRk) are triggered and synchronize with the grid. The contactors SA1 through SAn (except SAk) are caused to close. The DC current is set so that the DC voltage is not too high at the power converters. This current may be somewhat higher than the nominal DC current because the plant may not work at the MPP. The choppers no longer pulse.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A power converter arrangement for feeding electrical power generated by a photovoltaic generator with varying output power into an AC grid, the arrangement comprising a plurality of power converters, each power converter comprising input terminals for receiving a DC voltage, and output terminals for providing an AC power to the grid, the plurality of power converters being connected between output terminals of the DC generator in series via the input terminals wherein each power converter comprises a bridging switch and a resistance chopper, both being arranged between the input terminals of the corresponding power converter.

2. The power converter arrangement of claim 1, wherein the bridging switch is an electromechanical switch, in particular a DC contactor, or a semiconductor switch.

3. The power converter arrangement of claim 1, wherein the bridging switch is configured to bridge the corresponding power converter in the event of a failure of the power converter.

4. The power converter arrangement of claim 1, further comprising a transformer, the transformer comprising a plurality of primary windings, each primary winding being connected to output terminals of a corresponding power converter, the transformer further comprising a secondary winding connected to the grid.

5. The power converter arrangement of claim 1, wherein each power converter further comprises a grid filter connected to the output terminals of the power converter.

6. The power converter arrangement of claim 5, wherein the grid filter is an LC filter.

7. The power converter arrangement of claim 1, wherein each power converter comprises a further switch for disconnecting the power converter from the grid.

8. The power converter arrangement of claim 7, wherein each power converter further comprises a grid filter connected to the output terminals of the power converter, and wherein the further switch is arranged between the grid filter and the grid.

9. The power converter arrangement of claim 7, wherein the further switch is an electromechanical switch, in particular an AC contactor.

10. The power converter arrangement of claim 1, wherein the resistance choppers are operable to provide an initial load to the generator during a run-up process of the power converters.

11. The power converter arrangement of claim 1, wherein the resistance choppers are operable to stabilize the power converter arrangement in the event of failure of one of the power converters.

12. The power converter arrangement of claim 1, wherein the bridging switches are operable to bridge the corresponding power converters depending on the power output of the DC generator.

13. A power converter arrangement for feeding electrical power generated by a photovoltaic generator into an AC grid, the arrangement comprising a plurality of power converters arranged in series between terminals of the photovoltaic generator, each power converter comprising a bridging switch and a resistance chopper, wherein the bridging switches are operable to bridge a number of power converters depending on the power output of the photovoltaic generator, and the resistance choppers are operable to stabilize the power converter arrangement.

* * * * *